(12) United States Patent
Gillett et al.

(10) Patent No.: US 6,760,711 B1
(45) Date of Patent: Jul. 6, 2004

(54) MERCHANT OWNED, ISP-HOSTED ONLINE STORES WITH SECURE DATA STORE

(75) Inventors: Don M. Gillett, Redmond, WA (US); Eric S. Askilsrud, Renton, WA (US); Kristofer N. Iverson, Kent, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/229,494

(22) Filed: Jan. 11, 1999

(51) Int. Cl.$^7$ .............................................. G06F 17/00
(52) U.S. Cl. ........................................ 705/64; 705/26
(58) Field of Search ............................ 705/26, 27, 1, 705/40, 64, 71, 77; 380/25, 24

(56) References Cited

U.S. PATENT DOCUMENTS

| | | | | |
|---|---|---|---|---|
| 5,694,551 A | * | 12/1997 | Doyle et al. ................ | 705/26 |
| 5,903,652 A | * | 5/1999 | Mital .......................... | 380/25 |
| 5,949,882 A | * | 9/1999 | Angelo ........................ | 380/25 |
| 6,081,790 A | * | 6/2000 | Rosen .......................... | 705/40 |
| 6,125,353 A | * | 9/2000 | Yagasaki ...................... | 705/27 |

FOREIGN PATENT DOCUMENTS

JP            411095659 A   *   4/1999

OTHER PUBLICATIONS

Rogers, Amy; Martha Decorates the Web—Online site gridlocked as fans flock to Martha Stewart's home page; InternetWeek, Sep. 1997; p 33; dialog copy pp. 1–2.*

No Author; Axion Communications: BC's Leading Internet Technology Firms Join Forces to Provide Integrated E–Commerce Solutions to Business; Canadian Corporate News, Dec. 1998; dialog copy p.1–2.*

* cited by examiner

Primary Examiner—Thomas A. Dixon
(74) Attorney, Agent, or Firm—Lee & Hayes, PLLC

(57) ABSTRACT

An online commerce architecture enables merchants to setup online stores that are hosted by third party Internet service providers (ISPs). The architecture provides secure storage of the merchant's commerce information at the ISP-hosted store, based upon a private/public key pair owned by the merchant. When a purchase request is received from a customer, the ISP encrypts all or part of the request using a newly generated session key, and then encrypts that session key with the merchant's public key. The purchase request is stored at the ISP in its encrypted form. The merchant routinely accesses the ISP and retrieves the purchase requests in their encrypted form. The merchant decrypts the session key using the merchant's private key and then decrypts the purchase request using the recovered session key. Since only the merchant knows its private key, no one else (including the ISP) can decrypt the session key to decrypt the purchase requests for the merchant.

25 Claims, 4 Drawing Sheets

Installation

Purchase

MERCHANT OWNED, ISP-HOSTED ONLINE STORES WITH SECURE DATA STORE

TECHNICAL FIELD

This invention relates to online commerce systems. More particularly, the invention relates to online stores that are owned by merchants, but hosted by remote independent service providers (ISPs), and to secure protection of merchant owned data resident on servers located at the ISP's site.

BACKGROUND

Online commerce is experiencing dramatic growth in recent years. Merchants are developing sites on the World Wide Web (or simply "WWW" or "Web") at a rapid pace. With Web sites, consumers can access and order goods and/or services electronically over the Internet from the comfort of their own homes or offices. It is becoming fairly common for a consumer to browse a merchant's catalog online, select a product, place an order for the product, and pay for the product all electronically over the Internet.

In this new commerce setting, merchants would ideally like to design and host their own Web site to create a desired shopping atmosphere suitable for their products and services. Merchants would also like to manage its proprietary site within the confines of the company. Unfortunately, many merchants do not have the technical expertise to create and maintain a Web site on the Internet. Other merchants may not have the financial wherewithal to install and manage the computer system needed to support a Web site (especially, at their own location). As a result, many merchants turn to independent firms to create and/or manage Web sites on the merchants' behalf.

This is particularly true for small merchants who typically gain access to the Internet via Internet service providers (ISP). When a small merchant decides to open an online store, it commonly asks an ISP to provide the Internet connection and host the online store on its behalf. Online shoppers can browse the merchant's store and submit purchase requests for items that they would like to purchase. The purchase order identifies the item, cost, quantity, price, and so forth. Electronic purchase orders also typically include sensitive financial information, such as credit card numbers. The hosting ISP stores the purchase orders, including the credit card information, for subsequent access and retrieval by the merchant.

The merchant-owned, ISP-hosted architecture raises significant legal/liability concerns for the ISP and the merchant. Most security mishaps occur by having data stolen from a storage location, rather than having the data stolen "off of the wire" as it is being transmitted to a party, such as the ISP. If the ISP fails to set up the server correctly and someone steals a file containing unencrypted credit card numbers or other sensitive information, both the merchant and the ISP may become exposed to liability.

If online commerce is to move forward and be widely endorsed by ISPs, there is a need for an architecture that provides security at the ISP level to thereby reduce the exposure of ISPs to liability.

SUMMARY

This invention concerns an online commerce architecture that enables merchants to setup online stores that are hosted by third party Internet service providers (ISPs). The architecture provides secure storage of the merchant's commerce information at the ISP-hosted database, thereby diminishing the threat of theft or misuse of this information by parties other than the merchant. This storage security reduces liability for the ISPs and merchants.

The online commerce system includes a merchant computer resident at a merchant and a server computer resident at the ISP. The merchant registers with the ISP to have the ISP host the merchant's online storefront. During an installation process, Web pages forming the online store are created and stored at the ISP computer. A commerce Web server is run on the ISP-hosted computer. The ISP computer also hosts or runs a session key generator and an order encryption unit.

The merchant computer has a key generator and an order decryption unit. As part of the installation process, the merchant's key generator creates a pair of private and public keys associated with the merchant. The merchant's private key is retained at the merchant computer, while the merchant's public key is passed to the service provider computer and stored in a directory associated with the merchant's online store.

When a customer orders a product from the online store, the customer submits a purchase request containing product information and sensitive commerce data (e.g., credit card information). The commerce server hosted at the ISP receives the purchase request and generates a session key via the session key generator. The ISP order encryption unit encrypts part or all of the purchase request using the session key, and then encrypts the session key using the merchant's public key. The ISP stores the purchase request and session key in their encrypted form. In this manner, if illegal access to the IPS's machine is obtained, the stored sensitive data is protected because it is stored in an encrypted format and the private key needed to access the data is on the merchant's machine.

The merchant computer routinely accesses the ISP and downloads any purchase requests in their encrypted form. At the merchant, the merchant's order decryption unit decrypts the session key using the merchant's private key and subsequently decrypts the purchase request using the decrypted session key.

DETAILED DESCRIPTION

This invention concerns an online commerce architecture that enables merchants to setup online stores hosted by third party Internet service providers (ISPs). It is particularly well suited for small to medium size businesses that do not have the infrastructure to support their own full-blown Web site, but instead rely on ISPs to host their sites. The architecture provides secure storage at the ISP-hosted database of the merchant-owned commerce information provided by the customers. The secure storage diminishes the threat of theft or misuse of the commerce information by parties other than the merchant, thereby reducing liability for the ISPs and merchant.

The following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyrght 1994 (or second edition with copyright 1996), which is hereby incorporated by reference.

Online Commerce Architecture

Figure 1:
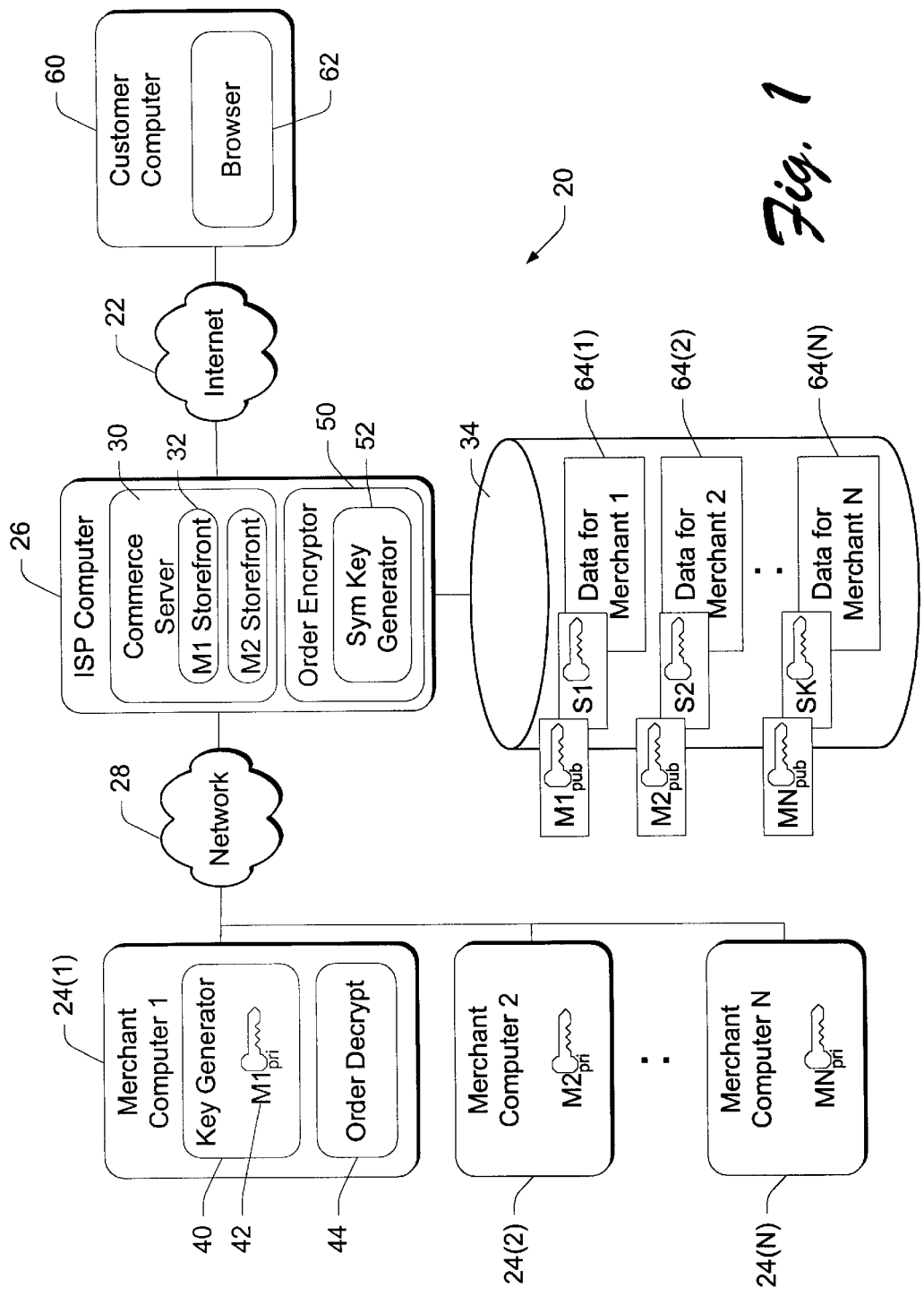
FIG. 1 shows an online commerce system having merchants, an independent service provider (ISP), and a customer. The system architecture enables the ISP to host a merchant-owned Web site and to securely store sensitive commerce data on behalf of the merchant.

FIG. 1 shows an online commerce system 20 in which customers shop for goods and/or services offered by merchants over the Internet 22. The merchants have their own computer systems, as represented by computers 24(1), 24(2), . . . 24(N). The merchant computers are coupled to an Internet service provider computer system 26 via a network 28, which may also be the Internet, but alternatively may be a wide area network, a telephone network, cable network, or other connection.

The merchants computers 24(1)–24(N), with the assistance of the ISP computer 28, create online stores that are merchant-owned, but physically hosted by the ISP computer 28. The ISP computer 28 is loaded with commerce server software 30 that allows the ISP to host online stores on behalf of the merchants. As one exemplary implementation, the commerce server 30 is the Site Server Commerce Edition software that is an add on to the Internet Information Services (IIS) software package designed to run on the Windows NT operating system, all of which are available from Microsoft Corporation. The commerce server includes a store builder module that helps a merchant set up an online storefront. The store builder module includes a store builder wizard that steps a merchant through a series of questions to extract information pertaining to the merchant's business and a page generator to produce Web pages based on the merchant-supplied information to form the online storefront.

The merchant uses a local Web browser (not shown) to remotely access the commerce server, and namely the store builder wizard, on the ISP computer 26. The wizard steps the merchant through several screens to gather product and pricing information, shipping preferences, payment methods, and so forth. Based on the merchant provided information, the ISP-based commerce server 30 creates the merchant's storefront 32 that is kept resident at the ISP computer. In FIG. 1, storefronts for merchants 1 and 2 are shown hosted at the ISP 26.

The ISP also has a storage or database 34 that stores commerce data on behalf of the merchants. For simplified stores, the data is stored in a file in storage 34. The commerce data is received from customers as a result of the customers placing orders for goods and services offered on the merchants' online stores 32.

As part of storefront building process, the merchant computer 24 is loaded with two software tools to assist in creating the online store. The tools are either loaded locally from a disk or downloaded from the ISP computer 26. The first software tool is an asymmetric key generator 40 that is used to generate an asymmetric key pair unique to the merchant and associated with the merchant's storefront 32.

The key pair includes a private key and a public key, which will be used to protect and access merchant-owned commerce data stored at the ISP storage 34. The key generator 40 installs the private key at the merchant computer, as represented by key 42 ($M1_{pri}$) on merchant computer 24(1). Different private keys $M2_{pri}$, . . . $MN_{pri}$ are created and installed at merchant computers 24(2), . . . 24(N), as a result of various merchants' store building processes. The key generator 40 passes the corresponding public key $M1_{pub}$ to the ISP computer 26 for use in protecting commerce data to be stored on behalf of the merchant.

The second software tool is an order decryptor 44 that is capable of performing decryption functions. The order decryptor 44 employs both asymmetric and symmetric cryptography to decrypt messages using either asymmetric keys or symmetric keys. As one example, the order decrypt 44 may be implemented as a cryptographic API (Application Program Interface) exposed in Windows-brand operating systems, such as the Windows NT operating system. The cryptographic API ("CAPI" or "CryptoAPI") is described in U.S. Pat. No. 5,689,565, entitled "Cryptography System and Method for Providing Cryptographic Services for a Computer Application", which is assigned to Microsoft Corporation. This patent is hereby incorporated by reference.

An "asymmetric" key algorithm involves two separate keys that are based upon a mathematical relationship in which one key cannot be calculated from the other key. Encryption and decryption using an asymmetric key pair can be represented as follows:

Asym.$E_{Kpri}$ (M)=M.enc

Asym.$D_{Kpub}$ (M.enc)=M where "Asym.$E_{Kpri}$" is an encryption function using a private key "Kpri," "M" is a message, "M.enc" is an encrypted version of the plaintext message, and "Asym.$D_{Kpub}$" is a decryption function using the public key "Kpub". The inverse is also true in that a message can be encrypted using the public key and then decrypted using the private key. In a public key system, as is the case here, the public key $M1_{pub}$ is distributed to other parties, such as the ISP, and the private key $M1_{pri}$ is maintained in confidence. The asymmetric public and private keys ensures that only the holder of the private key (i.e., the merchant) can decrypt a message that is encrypted with the corresponding public key. An example asymmetric algorithm is the well-known RSA cryptographic algorithm named for the creators Rivest, Shamir, and Adleman.

The order decryptor 44 also handles symmetric ciphers. In a "symmetric" cipher, the encryption key can be calculated from the decryption key, and vice versa. In many cases, the encryption key and the decryption key are the same. Once the symmetric key is divulged, any party can encrypt or decrypt messages. Example symmetric ciphers are a DES (Data Encryption Standard) encryption algorithm or an RC4 algorithm.

The ISP computer 26 is equipped with an order encryptor 50 that is capable of performing both asymmetric and symmetric encryption functions. The order encryptor 50 includes a symmetric key generator 52 that generates symmetric session keys, such as DES keys, that are used to encrypt and decrypt merchant-owned data stored on the storage 34. The symmetric key generator 52 generates a new session key for each purchase order received from a customer. The order encryptor 50 encrypts the order using a newly generated session key, and then encrypts that key using the merchant's public key.

As one exemplary implementation, the order encryptor 50 is built into a server pipeline component of the Site Server Commerce Edition manufactured and sold by Microsoft Corporation. The pipeline component calls a COM object that provides high-level cryptographic functions, which in turn calls the CryptoAPI layer. The strength of the encryption can vary as desired or permitted for export, from exportable encryption to higher non-exportable encryption.

A customer computer 60 facilitates customer access to the Internet 22. The customer computer 60 is equipped with a browser 62 that enables the customer to access and browse the storefront 32 hosted by the commerce server 30 at the ISP computer 26. When the browser 62 hits the Web site, the commerce server 30 serves one or more Web pages over the Internet 22 to the customer computer 60. Individual Web pages are typically configured as a hypertext document, such as an HTML document, which can be rendered by the browser 62 on the customer computer 60. The rendered pages create a store experience and provide product and pricing information.

As an alternative to static Web pages, the Web pages forming the storefront may be configured as an "active server page", or "ASP". An ASP is written in a combination of a hypertext language (e.g., HTML) and a scripting language, such as Visual Basic Script (or "VBS") or J Script from Microsoft Corporation, perl, python, REXX, or tcl. When the customer browser 62 requests an ASP, the scripting language is executed to produce a Web page in the form of a hypertext document that can be rendered by the browser. Active Server Pages are described in documentation available from Microsoft's Web site under the section Internet Information Services.

Exemplary Computer

Figure 2:
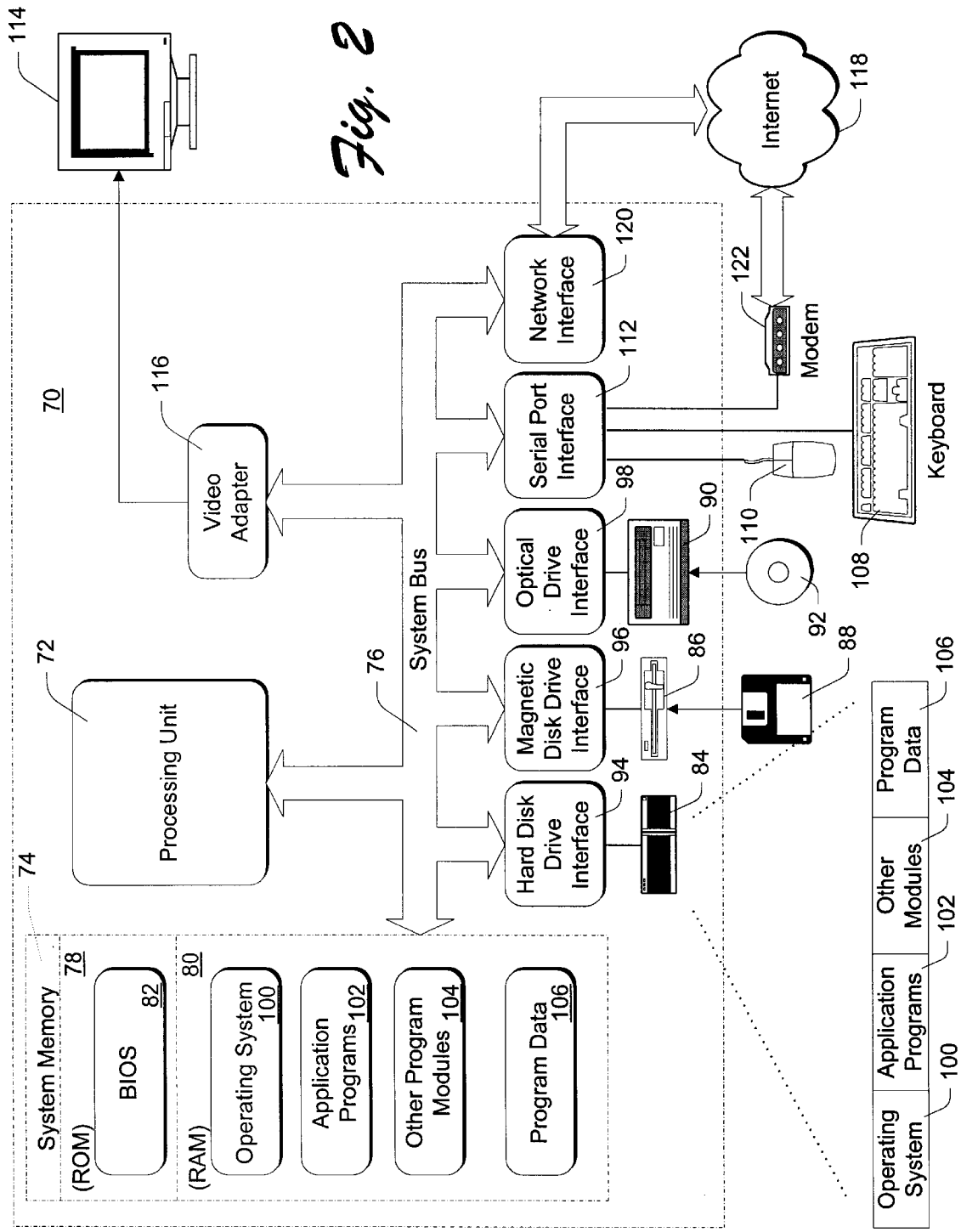
FIG. 2 shows an exemplary computer that can be configured at the merchant and/or ISP.

FIG. 2 shows an exemplary implementation of a computer, such as the merchant computer 24, the ISP computer 26, or the customer computer 60. The host computer is a general purpose computing device in the form of a conventional personal computer 70 that is configured to operate as a network server (in the case of the merchant and ISP computers) or as a client computer (in the case of the customer computer).

The server computer 70 includes a processing unit 72, a system memory 74, and a system bus 76 that couples various system components including the system memory 74 to the processing unit 72. The system bus 76 may be any of several types of bus structures including a memory bus or memory controller, a peripheral bus, and a local bus using any of a variety of bus architectures. The system memory 74 includes read only memory (ROM) 78 and random access memory (RAM) 80. A basic input/output system 82 (BIOS) is stored in ROM 78.

The server computer 70 also has one or more of the following drives: a hard disk drive 84 for reading from and writing to a hard disk, a magnetic disk drive 86 for reading from or writing to a removable magnetic disk 88, and an optical disk drive 90 for reading from or writing to a removable optical disk 92 such as a CD ROM or other optical media. The hard disk drive 84, magnetic disk drive 86, and optical disk drive 90 are connected to the system bus 76 by a hard disk drive interface 94, a magnetic disk drive interface 96, and an optical drive interface 98, respectively. The drives and their associated computer-readable media provide nonvolatile storage of computer readable instructions, data structures, program modules and other data for the personal computer. Although a hard disk, a removable magnetic disk and a removable optical disk are described, other types of computer readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 100, one or more application programs 102, other program modules 104, and program data 106. When implemented in the context of the ISP computer, the programs 102 or modules 104 include the commerce server 30, order encryptor 50, and database software or file management software to manage the merchant-owned data on the database or storage 34. When implemented in the context of the merchant computer, the programs 102 or modules 104 include the key generator 40 and the order decryptor 44.

A user may enter commands and information into the personal computer 70 through input devices such as keyboard 108 and pointing device 110. Other input devices (not shown) may include a microphone, joystick, game pad, satellite dish, scanner, or the like. These and other input devices are often connected to the processing unit 72 through a serial port interface 112 that is coupled to the system bus 76, but may be connected by other interfaces, such as a parallel port, game port, or a universal serial bus (USB). A monitor 114 or other type of display device is also connected to the system bus 76 via an interface, such as a video adapter 116. In addition to the monitor, personal computers typically include other peripheral output devices (not shown) such as speakers and printers.

The server computer 70 is connected to a network 118 (e.g., network 28 or Internet 22) through a network interface or adapter 120, a modem 122, or other means for establishing communications over the network. The modem 122, which may be internal or external, is connected to the system bus 76 via the serial port interface 112.

Operation

The online commerce architecture enables the merchants to setup their online stores at the ISP computer 26, and have the ISP temporarily receive and hold purchase requests placed by the customers. In general, there are three phases to establishing and operating the architecture: (1) an installation phase, (2) a purchase phase, and (3) a purchase review phase. These phases are described separately below with respect to the steps illustrated in FIGS. 3–5, and to the architecture of FIG. 1.

Phase 1: Installation

Figure 3:
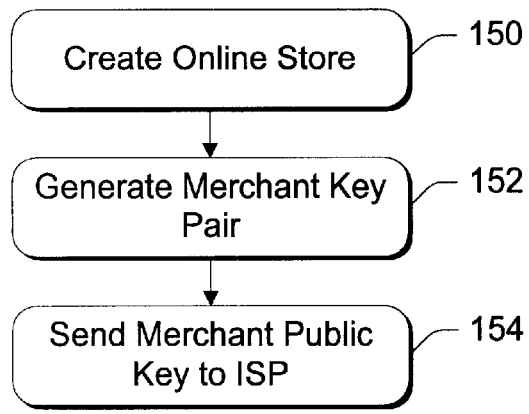
FIG. 3 is a flow diagram showing steps in a method implemented for installing a merchant online store at the ISP.

FIG. 3 shows steps in a method for installing a merchant-owned storefront 32 at the ISP computer 26. These steps are computer-implemented steps resulting from execution of program code at the merchant computer 24(1) and the ISP computer 26.

At step 150, the merchant computer 24(1) initiates creation of the M1 storefront 32 at the ISP computer 26. The merchant sets up an account for the ISP computer to host the merchant's online storefront 32 for Internet shoppers. In one exemplary implementation, the merchant can use a Web browser to invoke a store builder wizard supported by the commerce server 30. The merchant enters product information and answers a series of high-level questions pertaining to the merchant's business. Based on the entered information, the ISP-based commerce server 30 creates the merchant's storefront 32. This approach to creating an online storefront is described in U.S. patent application Ser. No. 08/970,217, entitled "Automated Web Site Creation Using Template Driven Generation Of Active Server Page Applications." This application was filed Nov. 14, 1997 in the name of Michael A. Cohen. This application is assigned to Microsoft Corporation and is incorporated by reference.

As part of the storefront creation, the merchant computer 24(1) downloads the key generator program 40 and the order decryptor utility 44 from the ISP computer 26. The merchant computer 24(1) runs the key generator program 40 near the end of the store builder wizard to generate a unique key pair (step 152). The merchant computer installs the private key $M1_{pri}$ locally in a registry for the user that is currently logged in and running the wizard. The merchant computer places the public key $M1_{pub}$ in a binary file and passes it over the network 28 to the ISP computer 26. The ISP computer stores the public key $M1_{pub}$ in a file system or system registry that manages the merchant's online store (step 154).

Phase 2: Purchase

When the customer decides to order a product or service, it submits a purchase request over the Internet 22 to the ISP computer 26. The purchase request may be passed over a secure path established between the ISP computer 26 and customer computer 60. As an example, computers running a Windows-brand operating system may establish an SSL (secure socket layer) connection that protects messages through cryptography that are being passed over an otherwise public and open network, such as Internet 22.

Figure 4:
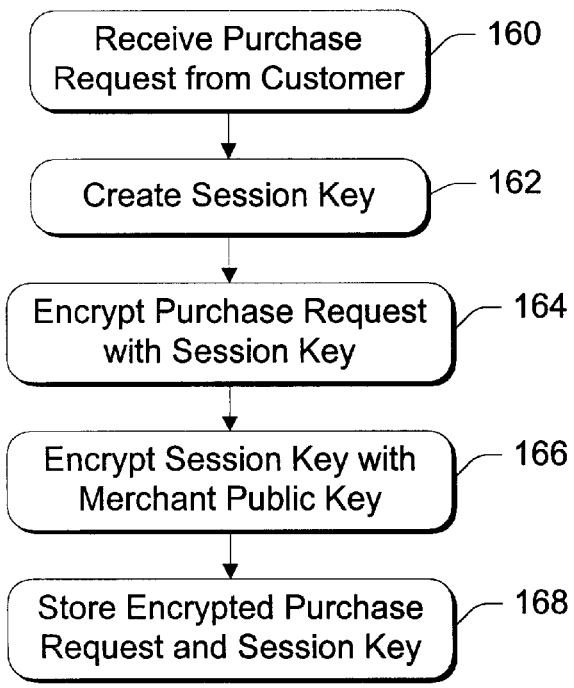
FIG. 4 is a flow diagram showing steps in a method implemented at the ISP computer system for receiving and handling a purchase order from a customer at the ISP.

FIG. 4 shows steps in a method for handling a purchase request received from the customer computer 60 at the ISP computer 26. The steps are computer-implemented steps resulting from execution of program code at the ISP computer 26.

At step 160, the ISP computer 26 receives the purchase request from the customer computer 60 via the Internet 22. The purchase request includes general information pertaining to the goods or services, such as a product ID, a customer ID, a quantity, a date, a payment method, and so forth. The purchase request might also include some commerce sensitive data, such as credit card information. The ISP computer 24 eventually saves the purchase requests in files in conjunction with the merchant, so that merchants can access and download their purchase requests when desired. In FIG. 1, the commerce server software 30 stores purchase data received on behalf of merchants 24(1)–24(N) in separate storage files, as represented by data 64(1) for merchant 1, data 64(2) for merchant 2, and data 64(N) for merchant N. These files are illustrated as being stored in database or storage 34.

Each purchase request is a data structure made up of different fields to hold various types of information. Since the purchase request contains sensitive data, such as credit card information, the order encryptor 50 is invoked to encrypt the entire data structure or the fields holding the sensitive information prior to storage in a file.

At step 162, the symmetric key generator 52 executing at the ISP computer creates a symmetric key used to encrypt a particular purchase request. For example, suppose that the key generator 52 generates a session key S1 to encrypt a purchase request received for merchant 1. At step 164, the order encryptor 50 encrypts all or part of the purchase request (PR) using the session key S1, as follows:

$Sym.E_{s1}$ (PR)=PR.enc where "$Sym.E_{s1}$" is a symmetric encryption function using a session key "S1" and "PR.enc" is an encrypted version of the purchase request.

At this point, the ISP computer 26 has encrypted the purchase request, but the session key to decrypt the request remains on the ISP server. To prevent the ISP operators or others who have access to the ISP server from accessing the merchant's data, the ISP order encryptor 50 also encrypts the session key S1 using the merchant's public key $M1_{pub}$ that is stored at the ISP computer (step 166). This is represented as follows:

$Asym.E_{M1pub}$ (S1)=S1.enc where "$Asym.E_{M1pub}$" is an asymmetric encryption function using the merchant's public key "$M1_{pub}$" and "S1.enc" is an encrypted version of the session key. Since only the merchant knows the corresponding private key $M1_{pri}$, only the merchant computer 24(1) can decrypt the session key to decrypt the purchase request.

The ISP computer 26 stores the encrypted purchase request and encrypted session key on the database 54 (step 168). This is represented in FIG. 1 by the purchase data 64(1), 64(2), ..., 64(N) being encrypted using associated and uniquely generated session keys S1, S2, ..., SK, with those session keys themselves being encrypted using corresponding merchant public keys $M1_{pub}$, $M2_{pub}$, and $MN_{pub}$.

Phase 3: Review

Figure 5:
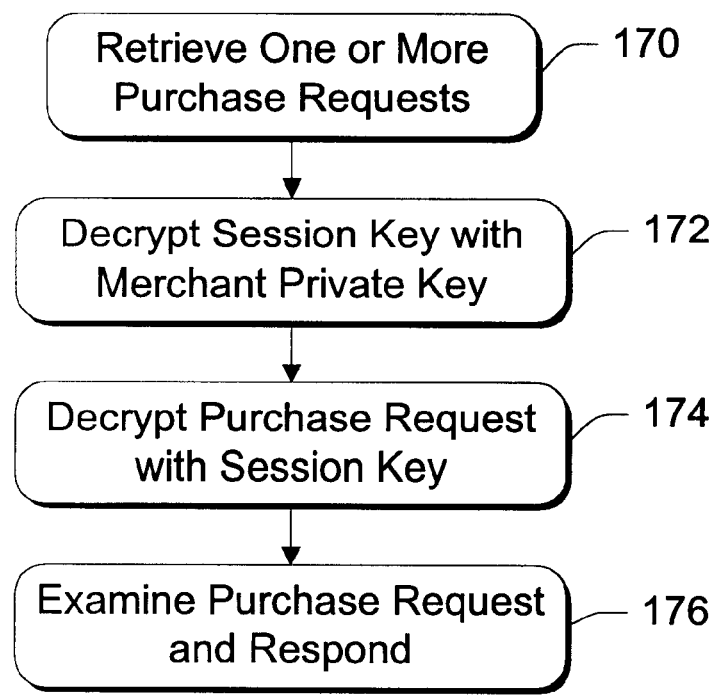
FIG. 5 is a flow diagram showing steps in a method implemented at a merchant computer for retrieving and reviewing purchase orders from the ISP.

FIG. 5 shows steps in a method for retrieving and reviewing purchase requests stored at the ISP computer 26 on behalf of the merchants. The steps are computer-implemented steps resulting from execution of program code at the merchant computer 24(1).

Periodically, or in response to a merchant-initiated request, the merchant computer 24(1) checks the ISP database 34 to see if any purchase requests for the merchant's products have been received. If so, the merchant computer 24(1) downloads the one or more purchase requests stored at the ISP computer 26 (step 170). The merchant computer 24(1) may use a browser to access and retrieve the data. In one implementation, when the browser detects an order download, an order management application is launched locally on the merchant computer 24(1). The application retrieves the private key $M1_{pri}$ and passes it to the order decryptor.

At step 172, the order decryptor 42 decrypts the session key S1 using the merchant's private key $M1_{pi}$, as follows:

$Asym.D_{M1pri}$ (S1.enc)=S1 where "$Asym.D_{M1pri}$" is an asymmetric decryption function using the merchant's private key "$M1_{pri}$". Only the merchant with knowledge of the private key $M1_{pri}$ can decrypt the session key. At step 174, the order decryptor 42 decrypts the encrypted portion(s) of the purchase request using the session key S1, as follows:

$Sym.D_{s1}$ (PR.enc)=PR where "$Sym.D_{s1}$" is a symmetric decryption function using a session key "S1". Once decrypted, the merchant can review the purchase request and respond as appropriately to the customer (step 176). It is noted that the customer receives immediate confirmation of his/her order and is not required to patiently wait for a response from the merchant. On occasions, the merchant may not review the orders for several hours or several days, and hence the customer is not required to wait for a response.

Conclusion

The invention advantageously provides an online commerce architecture that enables merchants to setup online stores hosted by Internet service providers (ISPs). The architecture enables secure storage of customer-supplied commerce information at the ISP-hosted database by encrypting the information and ensuring that only the merchant can ultimately decrypt the information. The threat of theft or misuse of this information by parties other than the merchant is greatly diminished, thereby reducing liability for the ISPs and merchant. In addition, the architecture is completely automated, allowing creation and operation without the merchant and ISP performing any manual steps.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An online commerce system comprising:
   a plurality of merchant computers, one merchant computer for each of a plurality of merchants, each merchant computer storing a private key and having a decryption unit;
   a service provider computer having a commerce server to host an online store on behalf of each of the merchants and to temporarily store merchant-destined commerce data received from customers of each online store, the service provider computer storing a plurality of public keys, each public key corresponding to a private key of a merchant computer, the service provider computer being further configured to identify a merchant for which merchant-destined commerce data is received;
   an encryption unit at the service provider computer that is configured to receive and encode merchant-destined commerce data for a merchant using, at least in part, a function based on the public key corresponding to the private key of the merchant; and
   the merchant computer of the merchant being configured to access and retrieve the merchant-destined commerce data for the merchant, and the decryption unit at the merchant computer decoding the commerce data using, at least in part, a function based on the private key of the merchant.

2. An online commerce system as recited in claim 1, wherein each merchant computer comprises a key generator to create the public and private keys for the merchant computer.

3. An online commerce system as recited in claim 1, wherein:
   the service provider computer comprises a key generator to create a session key; and
   the encryption unit at the service provider computer being configured to encrypt the merchant-destined commerce data for the first merchant using the session key and to encrypt the session key using the public key of the first merchant; and
   the decryption unit at the first merchant computer being configured to decrypt the session key using the private key of the first merchant and to decrypt the merchant-destined commerce data for the first merchant using the session key.

4. An online commerce Web site hosted at a service provider on behalf of a plurality of merchants, comprising:
   a server computer to host an online store for each merchant and to receive customer-supplied data from customers who visit the online stores, the server computer being programmed to transform customer-supplied data for each merchant in a manner that only the merchant for which the customer-supplied data is intended can convert the customer-supplied data back to an original form; and
   a storage to temporarily store the received customer-supplied data in its transformed state, the customer-supplied data received for one merchant being stored so that it is uniquely identifiable from the customer-supplied data received for the other merchants.

5. An online commerce Web site as recited in claim 4, wherein the server computer transforms the customer-supplied data for a merchant using one or more functions that utilize a secret supplied by the merchant so that the customer-supplied data cannot be converted back to the original form without knowledge of the secret.

6. An online commerce Web site as recited in claim 4, wherein the server computer encrypts the customer-supplied data for a particular merchant using a session key and encrypts the session key using a public key associated with the particular merchant.

7. An online commerce Web site as recited in claim 4, wherein each merchant downloads the customer-supplied data in its transformed state from the server computer.

8. A system architecture for an online commerce system in which a third party service provider hosts online Web sites on behalf of multiple merchants, comprising:
   a server to serve content on behalf of the merchants and to receive data supplied by customers that is destined for one of the merchants; and
   an order encryptor at the server to encrypt the merchant-destined data using a session key and to encrypt the session key using a public key associated with the merchant for which the data is destined.

9. A system architecture as recited in claim 8, further comprising an order decryptor to decrypt the session key using a private key associated with the merchant's public key and to decrypt the merchant-destined data using the decrypted session key.

10. An online commerce system, comprising:
    the system architecture as recited in claim 8, resident at the service provider; and
    wherein each merchant has its own pair of public and private keys to access their merchant-destined data.

11. A system architecture for an online commerce system in which a third party service provider computer system hosts online stores on behalf of multiple merchants, comprising:
    a commerce server, resident at the service provider computer system, to serve Web pages that, when rendered, present the merchants' online stores and to receive purchase requests supplied by the customer to purchase products from the online stores;
    an order encryptor, resident at the service provider computer system, to encrypt each purchase request using a session key and to encrypt the session key using a public key associated with a merchant associated with the purchase request; and
    an order decryptor, resident at the merchant computer system associated with the purchase request, to decrypt the session key using a private key associated with the public key and to decrypt the purchase request using the decrypted session key.

12. A system architecture as recited in claim 11, further comprising a key generator, resident at each merchant computer system, to generate the public and private keys for the merchant computer system.

13. A system architecture as recited in claim 11, wherein the order encryptor encrypts all data contained in the purchase request using the session key.

14. A system architecture as recited in claim 11, wherein the purchase request has multiple data fields, and the order encryptor encrypts selected ones of the data fields using the session key.

15. A method comprising:
    installing a first online store at a service provider remote from a first merchant;
    installing a second online store at a service provider remote from a second merchant;
    receiving first customer-supplied data at the service provider from customers who visit the first online store;

receiving second customer-supplied data at the service provider from customers who visit the second online store;

encoding the first customer-supplied data at the service provider from an original state to a transformed state in a manner that only the first merchant can decode the first customer-supplied data back to the original state;

encoding the second customer-supplied data at the service provider from an original state to a transformed state in a manner that only the second merchant can decode the second customer-supplied data back to the original state; and storing the first customer-supplied data in the transformed state and associating it with the first merchant;

storing the second customer-supplied data in the transformed state and associating it with the second merchant.

16. A method as recited in claim 15, wherein the encoding comprises:

encrypting the first customer-supplied data using, in part, a public key associated with the first merchant; and encrypting the second customer-supplied data using, in part, a public key associated with the second merchant.

17. A method as recited in claim 15, wherein the encoding comprises:

encrypting the customer-supplied data using a session key and encrypting the session key using a public key associated with the merchant; and encrypting the second customer-supplied data using a session key and encrypting the session key using a public key associated with the second merchant.

18. A method as recited in claim 15, further comprising:

retrieving the first customer-supplied data in the transformed state from the service provider to the first merchant;

decoding, at the first merchant, the first customer-supplied data from the transformed state back to the original state;

retrieving the second customer-supplied data in the transformed state from the service provider to the second merchant; and decoding, at the second merchant, the second customer-supplied data from the transformed state back to the original state.

19. A method for installing multiple online stores, comprising the following steps:

creating Web pages that form an online store owned by a first merchant;

creating Web pages that form an online store owned by a second merchant;

hosting the Web pages at a service provider remote from the merchants;

generating a first pair of private and public keys associated with the first merchant that are used to encrypt and decrypt merchant-destined data received via the online store owned by the first merchant;

generating a second pair of private and public keys associated with the second merchant that are used to encrypt and decrypt merchant-destined data received via the online store owned by the second merchant;

storing the first private key at the first merchant;

storing the second private key at the second merchant; and storing the public keys at the service provider.

20. Computer-readable media having computer executable instructions for installing multiple online stores, the computer-executable instructions performing the following steps:

creating Web pages that form an online store owned by a first merchant;

creating Web pages that form an online store owned by a second merchant;

hosting the Web pages at a service provider remote from the merchants;

generating a first pair of private and public keys associated with the first merchant that are used to encrypt and decrypt merchant-destined data received via the online store owned by the first merchant;

generating a second pair of private and public keys associated with the second merchant that are used to encrypt and decrypt merchant-destined data received via the online store owned by the second merchant;

storing the first private key at the first merchant;

storing the second private key at the second merchant; and storing the public keys at the service provider.

21. A method for handling a purchase request for goods and/or services offered in an online store, the online store being hosted by a service provider on behalf of a first merchant, the method comprising:

encoding the purchase request at the service provider in a manner that only the first merchant can decode the purchase request;

storing the purchase request in the encoded state; and wherein the service provider also hosts at least a second online store on behalf of a second merchant and stores encoded second merchant purchase requests in a manner that only the second merchant can decode the second merchant purchase requests.

22. A method as recited in claim 21, wherein the encoding comprises encrypting the purchase request using, in part, a public key associated with the first merchant.

23. A method as recited in claim 21, wherein the encoding comprises encrypting the purchase request using a session key and encrypting the session key using a public key associated with the first merchant.

24. A computer-readable medium having computer executable instructions for installing multiple online stores, the computer-executable instructions performing the following steps:

encoding a purchase request at the service provider in a manner that only the first merchant can decode the purchase request;

storing the purchase request in the encoded state; and wherein the service provider also hosts at least a second online store on behalf of a second merchant and stores encoded second merchant purchase requests in a manner that only the second merchant can decode the second merchant purchase requests.

25. Computer-readable media distributed at a service provider and a multiple merchant computers, the service provider hosting an online store on behalf of each of the merchants, the computer-readable media storing computer-executable instructions for performing steps comprising:

generating a pair of private and public keys associated with a first merchant;

storing the first merchant's private key at the first merchant;

storing the first merchant's public key at the service provider;

receiving a first purchase request at the service provider from a customer of the online store of the first merchant;

generating a first session key;

encrypting, at the service provider, at least a portion of the first purchase request using the first session key;

encrypting, at the service provider, the first session key using the first merchant's public key;

storing the first purchase request and the first session key in their encrypted form at the service provider;

transferring the first purchase request and the first session key in their encrypted form from the service provider to the first merchant;

decrypting, at the first merchant, the first session key using the first merchant's private key;

decrypting, at the first merchant, the first purchase request using the first session key;

generating a pair of private and public keys associated with a second merchant;

storing the second merchant's private key at the second merchant;

storing the second merchant's public key at the service provider;

receiving a second purchase request at the service provider from a customer of the online store of the second merchant;

generating a second session key;

encrypting, at the service provider, at least a portion of the second purchase request using the second session key;

encrypting, at the service provider, the second session key using the second merchant's public key;

storing the second purchase request and the second session key in their encrypted form at the service provider;

transferring the second purchase request and the second session key in their encrypted form from the service provider to the second merchant;

decrypting, at the second merchant, the second session key using the second merchant's private key;

decrypting, at the second merchant, the second purchase request using the second session key.

* * * * *